United States Patent
Rodgers

(10) Patent No.: US 7,741,971 B2
(45) Date of Patent: Jun. 22, 2010

(54) SPLIT CHIP

(76) Inventor: James Neil Rodgers, 8853 214th Place, Langley, BC (CA) V1M 2H9

( * ) Notice: Subject to any disclaimer, the term of this patent is extended or adjusted under 35 U.S.C. 154(b) by 480 days.

(21) Appl. No.: 11/738,494

(22) Filed: Apr. 22, 2007

(65) Prior Publication Data

US 2008/0258261 A1    Oct. 23, 2008

(51) Int. Cl.
 *G08B 13/14* (2006.01)
(52) U.S. Cl. ............ 340/572.1; 257/679; 257/E23.064; 257/E23.176; 361/737; 235/492; 340/572.7; 340/572.8; 340/10.3; 340/10.52; 340/14.61; 340/14.62; 340/14.63; 340/14.65
(58) Field of Classification Search ............. None
See application file for complete search history.

(56) References Cited

U.S. PATENT DOCUMENTS

| | | | |
|---|---|---|---|
| 2,981,877 A | 6/1961 | Noyce | |
| 3,138,743 A | 6/1964 | Kilby | |
| 2003/0153269 A1* | 8/2003 | Smit et al. | 455/41 |
| 2007/0046369 A1* | 3/2007 | Schober et al. | 330/7 |
| 2008/0090519 A1* | 4/2008 | Rofougaran et al. | 455/41.1 |

OTHER PUBLICATIONS

Tom Krazit, IDG News Service, "Intel's new dual-core Xeon targets four-chip servers", InfoWorld, Nov. 1, 2005.

* cited by examiner

*Primary Examiner*—Minh-Loan T Tran
*Assistant Examiner*—Fei Fei Yeung Lopez
(74) *Attorney, Agent, or Firm*—James Neil Rodgers

(57) ABSTRACT

The Invention, titled the "Split Chip" by the Inventor, contemplates an RFID enabled consumer oriented tracking system which protects consumer privacy by splitting a miniaturized silicon RFID transponder circuit into a retained piece and a detached piece. The two pieces are electrically connected by a fine piece of conductive material. Each piece is dependent upon the other in order to disgorge data. The electrical connection between the two pieces can be severed by the consumer by tearing the fine piece of conductive material at a designated spot on the substrate making the Split Chip moribund. Upon a return or refund of the consumer item the original data can be recovered through a laser guidance system which connects the retained piece and its alpha numeric identifier to a back end host computer administration network.

5 Claims, 3 Drawing Sheets

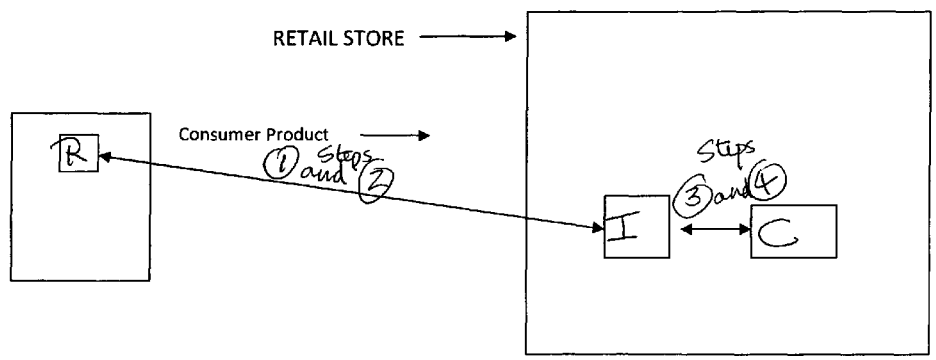

Return of Merchandise
(Illustrative-Not to Scale)
R= Retained Piece I= Interrogator C= Computer Step 1: Laser light guided magnetic coupling from Interrogator with remaining conductive material on Retained Piece enabling read of alpha numeric identifier. ( The laser light enabled conductive link with Retained Piece forms a conductive connection and via further computer link recreates data on original silicon circuit).Interrogator supplies needed antenna and operational circuits to enable read.

Step 2: Alpha numeric identifier information retrieved by Interrogator.

Step 3: Interrogator communicates alpha numeric identifier information to Computer.

Step 4: Computer database check corroborates valid consumer return item enabling refund.

Figure I: Design of RFID Miniaturized Silicon Circuit & Initial Steps of Operational Use
(Illustrative - Not to Scale)
R= Retained Piece, D= Detachable Piece

Step 1: The Design Features

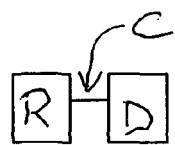

RFID Miniaturized Silicon Circuit

R= has memory circuits for data retention + elemental circuits
D= has etched antenna + circuits to operate the integrated circuit as a whole
C= conductive link

Step 2: RFID Silicon Circuit Attached to Illustrative Consumer Product

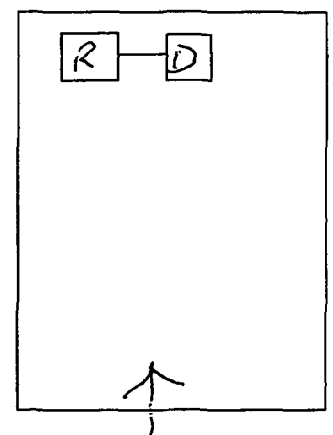

Consumer Product

Figure 2: Retail Checkout

(Illustrative-Not to Scale)

R= Retained Piece, D= Detachable Piece I= Interrogator, C= Computer

Step 1

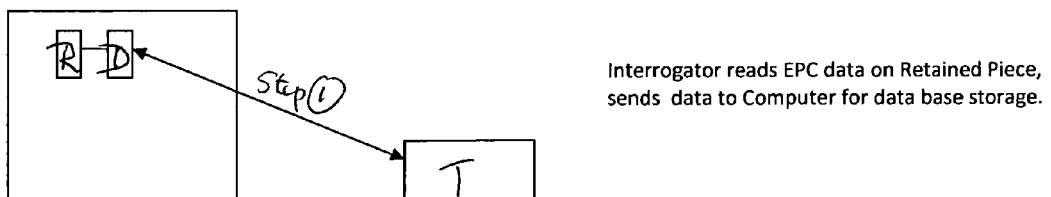

Interrogator reads EPC data on Retained Piece, sends data to Computer for data base storage.

Step 2

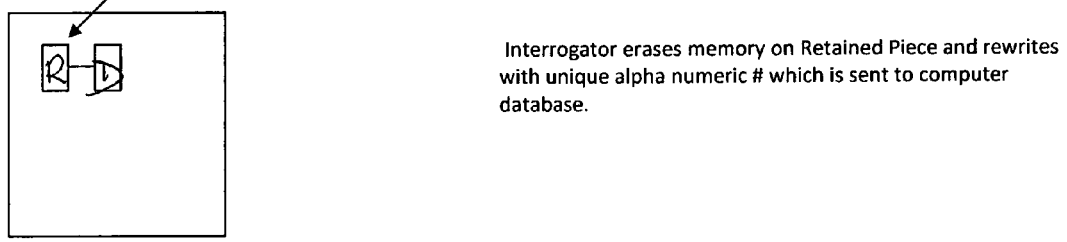

Interrogator erases memory on Retained Piece and rewrites with unique alpha numeric # which is sent to computer database.

Step 3

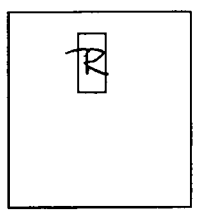

Consumer takes product after conductive link on silicon circuit severed. Retained Piece left on product. Detachable Piece kept by Store. Information on Retained Piece cannot be read because no antenna as well as insufficient transistors to operate.

Figure 3: Return of Merchandise
(Illustrative-Not to Scale)
R= Retained Piece I= Interrogator C= Computer

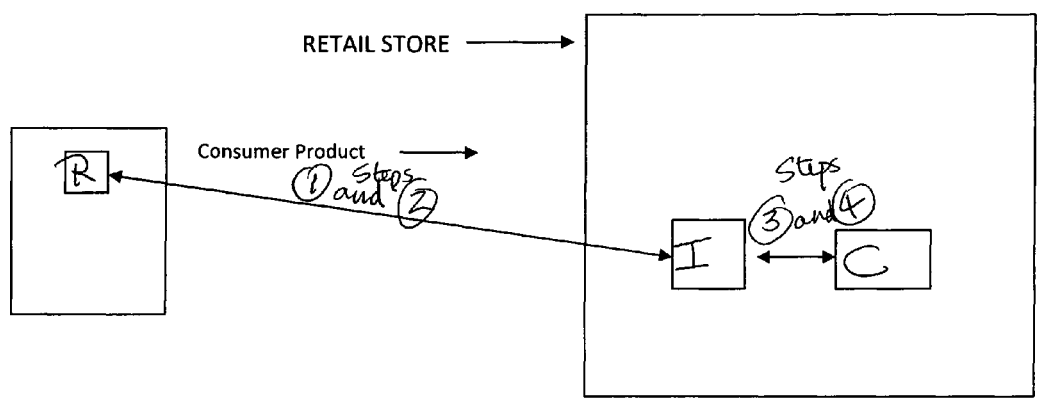

Step 1: Laser light guided magnetic coupling from Interrogator with remaining conductive material on Retained Piece enabling read of alpha numeric identifier. ( The laser light enabled conductive link with Retained Piece forms a conductive connection and via further computer link recreates data on original silicon circuit).Interrogator supplies needed antenna and operational circuits to enable read.

Step 2: Alpha numeric identifier information retrieved by Interrogator.

Step 3: Interrogator communicates alpha numeric identifier information to Computer.

Step 4: Computer database check corroborates valid consumer return item enabling refund.

SPLIT CHIP

CROSS REFERENCE TO RELATED APPLICATIONS

PG 20080252454, Clip Chip, Rodgers, herewith incorporated by reference

PG 20080217560, RFID Silicon Antenna, Rodgers, herewith incorporated by reference

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY REFERENCE OF MATERIAL SUBMITTED ON A COMPACT DISC

Not Applicable

BACKGROUND OF THE INVENTION

1. Field of the Invention

The field of the invention is Radio Frequency Identification (RFID) and in particular an RFID enabled consumer oriented system which protects consumer privacy.

2. Background

Radio Frequency Identification (hereinafter "RFID"), is a technology powered by small, wireless devices known as tags or transponders which can automatically track physical objects, animals and people when air interfacing with RFID readers, also known as interrogators. RFID can be seen as a means to explicitly label objects, animals and people so that tracking becomes automatic for back end computer host systems. Generally, in the RFID industry, an RFID tracking device which is known alternatively as a tag or as a transponder, is attached to or embedded in a product or product packaging and is air interfaced by radio frequency transmission with the antenna of an RFID reader/interrogator. The microchip itself can be as small as a grain of sand. The expense and size of a standard RFID tag or transponder package is a product of the external antenna which needs to be large enough to resonate at multiples of the wavelengths of currently authorized RFID frequencies. The antenna is usually constructed of copper or aluminum which is an expensive commodity. The authorized resonant frequencies for the antenna are Low Frequency in the 124 kHz to 135 kHz range. These have read distances of roughly two feet. There are High Frequency tags in the 13.56 MHz range with read ranges of over three feet. Moreover, there are Ultra High Frequency tags in the 860 MHz-960 MHz which have read parameters of up to 100 feet and more. RFID is being vigorously touted as a successor to optical barcode technology ubiquitous to consumer products. There are two advantages which RFID technology holds over the current barcode product identification system. First, the barcode indicates the type of object on which it is printed. For example, it will indicate to a cash register or check out automated system that the object in question is a yellow pencil of ABC brand. The RFID system goes a step further in that it emits a unique serial number which distinguishes it among millions of identically manufactured ABC brand of pencils. This unique identifying number can act as a direction finder to database entries which contain a plethora of transaction histories for individual product items. Second, barcodes are optically scanned with laser light which requires line of sight contact with readers in order for the scanning technology to operate properly. This usually means human intervention to carefully position the object to be scanned. RFID technology does not require line of sight to operate properly. It can scan hundreds of items per second. For example, a fast moving conveyor belt in a factory can be scanned for objects of interest with no need for line of sight contact.

In a supply chain application RFID is becoming ubiquitous in the tracking of crates and pallets. These are considered to be discrete, but bulk (not item level), quantities of objects. Tracking in the supply chain scenario is concerned with improving accuracy and timeliness of information regarding the whereabouts and movement of goods which comprise any specific supply chain.

In attempting to keep costs to a minimum RFID tags which are manufactured according to Electronic Product Code (hereinafter "EPC") standards carry extremely limited on board memory. Normally, the only information on the EPC tag is the unique number as well as the usual informational data of a barcode. There can also be a link to database records for any specific tag. Although the EPC tag can be up to 96 bits in data or informational length, the centralized host database can have unlimited entries or cryptographic security algorithms regarding any specific tag in question. Part of the EPC protocol is a reference service known as Object Name Service or ONS. Its purpose is to route tag queries to the database of specific tag owners or to the database of back end computer host managers. In other words, there is a system designed and in place for legitimate back end systems to track and trace all objects in an RFID system.

All communication for RFID interrogators and transponders is via an insecure medium. That medium is air, also known as the atmosphere, and sometimes referred to as the environment. In other words, all wireless communication using RFID technology travels through an atmosphere, or an environment, shared by legitimate and illegitimate users or wireless technology alike. The shared medium highlights security and privacy problems for retail consumers of products containing item level RFID tags, whether attached or embedded.

There are two main privacy concerns espoused by privacy proponents and lobbyists. Specifically, these are clandestine tracking and inventorying. As RFID tags respond to reader interrogation without alerting the holder of a tagged item, surreptitious scanning of tags is a serious security threat. Pursuant to EPC protocol each tag always emits a unique identifier. This includes even those tags which protect data with cryptographic algorithms. The result is that a person in possession of an item level object which has a tag attached to it or embedded into it effectively transmits a fixed identifier number to any nearby interrogators. Therefore, tracking the whereabouts of a retail consumer in possession of an RFID tag is easy for those so inclined. This is true even if the unique identifying number is random or carries no intrinsic data. Consider it to be a beacon, like a lighthouse on a pitch black night, which never turns off.

SUMMARY OF THE INVENTION

This invention describes a system and method whereby an RFID silicon integrated circuit is split into two parts connected by conductive ink. On one half of the integrated circuit is the memory and some elementary circuits designed to operate this memory as well as the passive transistor circuitry known as the capacitor and inductor. On the other half of the integrated circuit are the silicon antenna and the rest of the active transistor circuitry required to operate the silicon integrated circuit as a whole. Connecting these two halves is a fine piece of conductive material, such as conductive ink. The purpose of this invention is to describe a system and method of design for a whole, yet bifurcated, silicon circuit as opposed to an integrated silicon circuit. In so doing, one half can be detached from the other half by tearing, ripping or in some other manner shearing the conductive ink which connects the two halves. When sheared the two halves are disconnected. In this state of disconnection the circuit is inoperable. The half of the silicon circuit which contains the antenna and active transistor half has no memory transistors and therefore cannot retain data. If the antenna is skimmed with a resonant frequency there is no information available to the skimmer. The other half of the circuit contains only passive parts of the entire circuit plus the memory. This half, without the antenna, cannot be skimmed. There is no manner in which the information or data on the memory section can be radiated from this half of the bifurcated circuit. The result is that consumer privacy is protected for consumer items which have RFID tags attached or embedded within them. The invention describes the circuitry of a bifurcated silicon chip which the Inventor has named the "Split Chip." The name "Split Chip" is the subject of a U.S. Trademark application.

This Split Chip invention refers to Rodgers application Ser. No. 11/733,949 titled, "Clip Chip". The Clip Chip Application is incorporated herein by reference. The Clip Chip invention is a solution to RFID privacy concerns as these concerns relate to consumer goods. It surrenders control of the administration of privacy of personal information from the retailer to the consumer of retail goods. This is accomplished by splitting the RFID transponder into two pieces. On one piece, which is always attached to the consumer item, known as the retained piece, is a unique alpha numeric identifier. On the other piece, which can be detached from the consumer item, known as the detached piece, are the standard EPC data. The two pieces are connected by conductive ink. The consumer is empowered to disable the chip at the point of purchase by tearing the two pieces of the chip in two severing the conductive ink and thereby rendering both pieces of the chip moribund. Furthermore, the Clip Chip system contemplates a method to reconnect the circuit using a secure back end system upon the circumstance of a return of the consumer item for exchange or refund.

This invention also refers to Rodgers application Ser. No. 11/683,056 titled, "RFID silicon antenna," which is incorporated herein by reference. The RFID silicon antenna is a system of producing an RFID antenna using the silicon in an integrated circuit as the resonant antenna material for the purpose of reducing the cost of an RFID system and for the purpose of increasing the range and selectivity of the RFID system. According to the RFID silicon antenna invention the base silicon sheets which make up the primary building material of the silicon chip (integrated circuit) is subjected to a laser ablation process. This creates three dimensional nano structures on the surface of the silicon thereby raising its absorption rate of electromagnetic signals. On the reverse side of the same silicon sheet a directional antenna is etched using standard photographic reduction techniques and standard semi conductor industry manufacturing methods. The two sides of the silicon are connected through doping aluminum or copper impurities into these same base silicon sheets causing conductivity within the sheet of silicon.

BRIEF DESCRIPTION OF THE SEVERAL VIEWS OF THE DRAWINGS

FIG. 1 Illustrates the Design Features of the RFID Miniature Silicon Circuit (Bifurcated Circuit) and the initial Step in Operational Use.

FIG. 2 Illustrates the operational steps in retail checkout use of the RFID Miniature Silicon Circuit FIG. 3 Illustrates the operational steps in returning Consumer Products with attached Retained Piece of the initial RFID Miniature Silicon Circuit.

DETAILED DESCRIPTION OF THE INVENTION

By way of background information silicon chips are small rectangles of silicon. They are usually 4 or 5 square centimeters in area. The silicon acts as a base, or substrate, upon which the chip is built. It also plays a part in the electrical operation of the device. The chip is made up of a number of layers of pure and impure silicon which are built up on one side of the silicon rectangle. The lower layers interact to form the active components which are usually transistors. The upper layers are usually wires and are known as passive components.

Pure silicon is an insulator. During silicon wafer manufacturing impurities are added to the silicon base material as a layering process. This process is known as doping. The impurities which are added increase the number of free charge carriers or charged particles that are free to move about within the silicon. The result is that the silicon becomes progressively more electrically conductive as more impurity is added; Hence the name semi conductor. The type of impurity added affects the type of charge carrier. For example, some impurities generate free electrons which are negative charge carriers. This type of silicon is known as n-Type. They are others which generate holes or space where electrons should be. These particle spaces behave as positive charge carriers and are known as p-Type.

The current silicon manufacturing process uses technology referred to as "complementary metal oxide semiconductor", also known as CMOS. During the CMOS process the embedded regions of the transistor form the source and drain for electron movement. The surface layers of the silicon wafer contain diffuse ions. These regions are often made from a mixture of silicon and metal. The metal has lower resistance allowing signals to travel faster. The insulator plate which goes between the silicon and the conducting plate is made of silicon oxide, also known as glass. The conducting plate or gate itself is poly crystalline silicon or "poly". This part of the silicon is without a uniform crystal structure and can be distinguished from the silicon substrate on which the chip is placed.

The typical manufacturing process for silicon chips is to add layer upon layer of silicon with each layer comprising differing levels of electrical conductivity or circuit complexity. There are more electrically active layers which form the transistors. There are electrically passive components, for example wires, which connect transistors together. These differing layers are separated from each other by silicon oxide. Holes are made in the silicon oxide to make connections between the various layers. Furthermore, there are many wiring layers in modern chips. Traditionally, the metal used for wiring is aluminum or copper. Traditionally each layer has been placed one upon the other to form one stack. This stack is then encased in metal with connective pads attached. This Invention proposes that the stack be split in half and that each half be connected one to the other via a conductive ink conduit.

One of the key tools for integrated circuit manufacture is laser light. This is because lasers provide a key enabling technology for the semiconductor industry. They are used to inspect and repair the mask and wafer. Nanosecond and femtosecond diode pumped solid state lasers at 355 nm and 266 nm are used to inspect the circuits. They use repair tools which are designed to correct feature defects in the chrome absorber or quartz transmissive mask substrate patterns.

The mask (circuit) pattern is applied onto the silicon substrate layer by layer. The mask is made up of circuit features spun unto the surface of a polished silicon wafer. In layman's terms, a very complicated circuitry is drawn at a very large macro level (room size) so that minute detail can be designed into an electronic circuit. This circuit is then photographed. The photograph, instead of being enlarged as is the normal in photography, is reduced in size. It is reduced to the size of the end of a pin needle. This reduced photograph is then photo exposed on a thin layer of photosensitive polymer which becomes part of the silicon mask. In more technical language the photolithographic detailed circuit is de-magnified replicating all features of the circuit perfectly. This is then made into a master stencil mask. It is illuminated in transmission by an ultraviolet light source. There is then a complex method of developing the de-magnified photograph through a process of photo resist, stripping, etching, ion implantation and deposition. After that, photo type exposures are repeated with different mask patterns as complex chip circuitry is built up, layer by layer, on the silicon wafers. This Invention proposes that two stacks of layers be built up instead of one, connected by conductive ink.

The typical integrated circuit manufacturing process achieves size reduction in the photolithography mask imaging process by a combination of reducing the wavelength of the exposure source, increasing the resolution of the magnifying lens and using phase shifting masks. Furthermore, corrective structures to the mask features can be added and the photosensitive response of the resist can be tailored.

This invention contemplates taking the technology that is currently in use in the semiconductor industry and utilizing it to construct two halves of one integrated circuit connected by conductive ink. The Split Chip, when designed, would be photographed, reduced in size, and through a process of photolithography, well known to the semi conductor industry, plus deposition, etching and stripping, the Split Chip would be introduced onto two separate silicon wafers.

As outlined earlier all communication for RFID interrogators and transponders is via an insecure medium. That medium is air, also known as the atmosphere, and sometimes referred to as the environment. In other words, all wireless communication using RFID technology travels through an atmosphere, or an environment, shared by legitimate and illegitimate users or wireless technology alike. The shared medium highlights security and privacy problems for retail consumers of products containing item level RFID tags, whether attached or embedded. The threat to consumer privacy grows stronger if the unique identifier on the RFID tag is combined in any way with personal information. An example is a grocery store which accepts payment via a credit card for twelve tagged items. These specific twelve items can be linked to the identity of the purchaser through the credit card number which is known to the grocery store at the time of purchase interrogation. Marketers can then identify and profile consumers using networks of RFID readers placed surreptitiously around the grocery store. Furthermore, EPC tags carry information about the object to which they are attached, for example, the manufacturer and product code. Therefore, a person who is wearing or carrying items with EPC tags attached is subject to being inventoried. In other words, a nefarious individual could determine clothing worn, sizes, plus accessories as well as medications carried and harvest or capture this important, yet highly personal and private information into a commercial database. The target consumer could be innocently strolling a mall and be none the wiser for this intrusion. This process is known as skimming.

There have been a number of ineffective privacy protecting schemes put forward as prior art. There is a stop provision for EPC tags called "killing the tag". According to this provision, when an EPC tag receives a kill command from an interrogator the tag renders itself permanently inoperable. The kill command is PIN protected and is accomplished via the interrogator which transmits a tag specific 21 bit PIN in the EPC Class A, Gen 2 protocol. This is a very effective means of securing privacy. The tags are effectively dead at the point of sale. This is the same approach taken by a removable tag security system. Although brutally effective, these two methodologies of "killing the tag" obviate any benefits which would be garnered from post purchase tag interrogation. For example, for library books the tag is supposed to operate for the life of the book. In a retail situation, for example, receipt less item returns become a problem for the retailer if the tag is killed or taken from the retail object.

Another ineffective security approach is to put the tag to sleep rather than to kill the tag. This means to render the tag temporarily inoperative. However, if any reader is able to wake the tag then there would be no security benefit. There would have to be some sort of access control. This could take the form of PIN access. This would lead to a plethora of PIN numbers for a consumer to memorize in order to wake individual tags on countless consumer items. This solution is unworkable in a real world environment. Additionally, there are some "touch" types of security concepts; for example, touch a cellular phone to render the tag awake. In this scenario a holder of a contact less card places the card in the smart card reader located on the cellular telephone. Most European cellular telephones contain smart card readers. When so inserted the smart card chip can be activated by dialing a specific initiation number and inserting the correct PIN number. However, this type of "touch" solution negates the benefits of RFID. In other words, if a touch is necessary to activate the tag then why design or implement a wireless method of interrogation?

The prior art includes numerous attempts to secure privacy through various cryptographic methods. This method generally contradicts the business case for RFID. The business case requires cost effective tags. The more information or data which needs to be written onto the chip memory the larger and more expensive the chip will become. All cryptography systems, even the ones deemed minimalist, require serious storage space for cryptographic algorithms to be located upon chip memory systems. This increases the chip cost and complexity of manufacture. This same argument can be applied for on tag access control security systems such as hash locks or pseudonyms or off tag access control such as blocker tags or tag reader authentication such as lightweight protocols and adapted air interfaces. All of these potential solutions require high end, battery operated, and expensive RFID tags for proper implementation.

The most important part of RFID security in a consumer environment is user perception of security and privacy. As users cannot see electromagnetic signals, impressions are formed on physical cues and industry explanations for any given RFID system. The key to commercial success is to form a secure physical access control easily perceived by the consumer, plus secure logical access, to the personal data and information on a consumer oriented RFID system. The Clip Chip focuses on a system and method of design and engineering which physically and logically secures RFID critical data. At the same time this system and method is usable and commercially viable as an operating RFID system. This Clip Chip invention permits business decisions which lever all of the advantages of wireless communication while demonstrating physical and logical security for personal information which is the private property of individual consumers. Commercial viability of this invention is a function of the surrender of privacy control of consumer information to the consumer. Commercial viability is also a function of a simple design structure for this invention as well as less costly manufacturing costs as compared to prior art inventions.

Some other of the flawed prior art and inventions include IBM's Clipped Tag design which allows consumers to tear off most of a passive RFID tag's antenna. This technology was developed by IBM researcher Paul Moskowitz at IBM's Watson Research Center. The primary goal of the research was to preclude the reading of an RFID tag from a retail item carried by a consumer through the auspices of an unauthorized person in possession of an RFID interrogator. A number of alternative solutions were considered. Moskowitz reviewed the use of a blocker tag which renders nearby tags difficult to read. However, this solution meant that the blocker tag would need to be carried with the consumer at all times. This was considered to be an unwieldy proposition unacceptable to retail consumers. Also considered was a scratch off tag which included a small strip of printed electrical conductor which links the chip and a short portion of the tag's antenna. To shorten the read range consumers would scratch off the printed electrical conductor with a penny. This was deemed too complex to manufacture and less convenient for the consumer. The solution proposed by Moskowitz was a perforation which allowed the consumer to tear off most of a tag's antenna. This reduces the operational range of the antenna to a very short distance. The specifications for the perforated tag are four inches by three inches with the perforation line across each half of its dipole antenna. Once its sides are torn off, along the manufactured perforation lines, the tag remains operable, but its read range is reduced from 20 feet to a matter of several inches. Moskowitz says that consumers can make the tag unreadable through the physical process of tearing the perforation. The tag cannot be read unless presented directly in front of an interrogator. If a customer needed to return an item, the retailer could use a stationary or handheld interrogator to read the tag from a very close range. The Clip Tag technology of IBM is not really security at all. The physical measurements of the tag make it an easily identifiable target for information thieves. By admission the design of the Clip Tag technology only shortens the length of the antenna thereby reducing the read range. This technology does not disable the chip. It puts a title such as Clip Tag to a system which is far more perception than reality. The truth is that any thief with a powerful enough interrogators could still read the information on the tag. While this technology may give the consumer some solace on its face, careful scrutiny reveals a fatal flaw.

Similarly, another new technology from an Australian provider titled the Smart & Secure Retail Tag is designed to address consumer concerns that data encoded to tags on the items purchased could be read by a third party without the knowledge of the consumer. The methodology of accomplishing this is by decreasing the read distance of a tag. After the item is purchased a Consumer can reduce read distance by unfolding the substrate which contains the tag antenna. An edge of the substrate which contains the antenna and which is attached to the retail product is designed so that it can be securely grasped by the consumer. When the substrate material is pulled at its edge the tag unfolds thereby reducing read range. To re-engage the original read range, in the case of a returned item for example, the edge is grasped so that the chip/antenna package can be refolded thereby setting the apparatus to the original read range. The key is that the tag is never fully disabled.

The fatal flaw to this technology is the same as that of the IBM Clip Tag. The antenna is never fully decommissioned. While this Australian system and invention allows for return of items it does not adequately address the consumer privacy issue. It provides perception of security while not actually providing real security. Like the IBM solution, a thief with an interrogator with enough harvesting power can still surreptitiously interrogate a tag.

The solution proposed by the "Clip Chip" is to utilize either the perforation or unfolding method outlined herein, or by other means, in a manner which prevents the information or data on the tag or transponder from being read or the consumer carrier of the tag from being tracked. This invention proposes providing real privacy security in addition to appearance and perception from the vantage point of the consumer by splitting the chip into two parts. Instead of perforating or unfolding the substrate to reduce the read range by shortening the antenna, this invention proposes splitting one part of the chip from the other, thereby rendering the system unreadable. For example, a perforation could be placed on the substrate of the tag. A consumer could tear same, thereby giving the appearance and perception of security. On one side of the tag package there is a silicon component which houses one piece of the integrated chip package. On the torn off side of the attached tag would be the other part of the integrated chip package. The two sides would be connected, when operating as a whole, by a fine piece of conductive material, such as a conductive ink. At the time of sale of the consumer object the connected integrated chip package would be read using a standard RFID system. Hence all of the convenience of RFID is intact. At the time of retail check out the information stored on that piece of the integrated chip package which is torn away is automatically harvested and captured by the interrogator and communicated by secure land line to a host, back end, computer database. The part of the chip remaining attached to the item purchased would have only a simple identifier alpha numeric which would reference the purchased object to the back end host system database. This information would not be harvested directly to the back end system but would be stored separately in cryptographic format. As the chip is torn in two and is inoperable, it cannot be read by someone eavesdropping no matter how powerful the interrogator. When torn, the chip will not function as the antenna section is no longer attached to the transistor section. Furthermore, it cannot be used to track an individual as it is no longer operable. Physically it cannot reflect any information or data. However, in the event of a returned item, the connection to the host back end computer management system can be made by physically placing the communicating ink in contact with a specifically designed returned item reader.

A return for exchange or refund of a consumer product which has the retained piece of the silicon integrated circuit package attached as contemplated by the RFID integrated circuit package system contemplated herein which is presented to the retailer by the consumer as a returnable can have the alpha numeric identifier contained on the retained piece connected to the consumer information contained in the back end computer hosted database through a laser light connection to the tag end of the conductive ink remaining on the retained piece so that the retained piece and the information in the back end database complete one circuit effectively recreating the data on the original silicon integrated circuit package.

Therefore, in the circumstance of a consumer requirement to reactivate the RFID tag, such as a returned consumer item to a retail outlet, a returnable, the integrated circuit which remains attached to the tagged consumer item is placed into a returned item interrogator. This returned item interrogator connects to the conductive ink tag end of the piece of the transponder still attached to the consumer good through the use of micro laser technology which guides a magnetic coupling mechanism thereby effectively putting the two pieces of the RFID tag back together again.

In other words, the two halves of the chip, more specifically the information on the two halves of the chip, are reconnected. In this fashion, the alpha numeric identifier is cross referenced to the host database information. In essence, the Clip Chip stores all relevant information in a management owned and controlled, back end, host computer database. This inventive system splits the critical and highly personal consumer information into two distinct pieces. One piece is useless without the other piece. This means that even if the host database is corrupted, for example by being compromised through computer hacking, the information cannot be connected to any particular item in the marketplace. The information in the host database cannot connect to the alpha numeric item unless it is returned to the place of purchase. The backend host system only has part of the piece of the puzzle as the alpha numeric identifier is stored separately and secured by cryptography. This invention offers to consumers a real choice for privacy while providing all of the perception of security through the perforation or unfolding type of physical methodologies enunciated herein. The logical security for the highly personal consumer information is accomplished by the split in two designs which is activated when the chip is clipped to render it inoperable.

The Split Chip is the logical follow on from the Clip Chip. It is the physical design and system of operation of the electrical components which make up the bifurcated silicon chip or silicon disintegrated circuit.

The prior art includes an Intel dual core Xeon server. This product offers dual core processors across its server products. The dual core processor is the chip industry's answer to problems caused by excessive heat. The heat is caused by fast single core processors built with the current leaky transistors. The concept is that the dual core chip contains two separate central processing units. These two central processing units are located on a single piece of silicon. The result is that it allows chip designers to improve performance albeit with the cost of lowering clock speed of the chip. This product can be distinguished from the present Invention in that it has two processors contained on one piece of silicon. The present Invention has two halves of one circuit contained on two separate pieces of silicon connected by conductive ink.

Other prior art includes the patents of Jack Kilby of Texas Instruments awarded in the 1960s. These patents include U.S. Pat. Nos. 3,138,743; 3,138,747; 3,261,081 and 3,434,015. All of these aforementioned patents address the design and manufacture of an integrated circuit contained upon a piece of germanium. The distinguishing feature of the present Invention is that it does not contemplate an "integrated" circuit. It contemplates a "bifurcated" circuit contained on two pieces of silicon connected by conductive ink, also referred to as a disintegrated silicon circuit.

The patent of Robert Noyce of Fairchild Semiconductor Corporation U.S. Pat. No. 2,981,877 contemplates an integrated circuit on silicon instead of germanium as in the Kilby patents above. The distinguishing feature of the present Invention is that it does not contemplate an "integrated" circuit. It contemplates a "bifurcated" circuit contained on two pieces of silicon connected by conductive ink, also referred to as a disintegrated silicon circuit.

The Split Chip invention is a system and method of design whereby an RFID silicon integrated circuit is disintegrated. In other words, a usual RFID transponder chip is constructed in such a fashion that one half of the chip is on one piece of silicon and another is on another piece of silicon. Each half is dependent upon the other half in order to communicate data. The two halves are connected by a fine piece of conductive material such as conductive ink. The Inventor calls this a bifurcated silicon chip or bifurcated silicon circuit or disintegrated silicon circuit and has made application for the U.S. Trade Name "Split Chip."

The bifurcated silicon chip is constructed of two pieces. One piece is called the retained piece and is that part of the RFID transponder which remains attached to a consumer good or article after the RFID transponder has been disconnected according to the method outlined in the Clip Chip Application referred to herein. The other piece is called the detached or detachable piece and is that part of the RFID transponder which is the clipped portion of the bifurcated silicon circuit or chip as outlined in the Clip Chip Application.

The present Invention proposes that the retained piece of the bifurcated circuit contain the active transistor parts of the circuit. Furthermore, this piece also includes the memory transistor circuit which stores all information required to be correlated to the consumer object or article which is being tracked by an RFID system. The detached or detachable piece contains the antenna and all other passive parts of the circuit. These include the resistors and capacitors.

According to this Invention the retained and detached pieces are connected by a fine piece of conductive material such as conductive ink which, when whole, connects the two halves to make up one fully functioning RFID transponder. However, when the conductive ink is severed, the detached piece has no memory circuits and therefore has no data to communicate. In other words it cannot be skimmed of data because no data is contained thereon. Furthermore, the retained portion which contains the memory section and active transistor circuitry has no antenna and therefore cannot radiate electromagnetic signals. In other words it cannot be skimmed of data as it has no means to radiate and therefore cannot communicate.

PREFERRED EMBODIMENT

This present invention, in a preferred embodiment, contemplates a Split Chip method and system as part of the Clip Chip method and system. Accordingly, when a consumer severs the RFID transponders after purchase the RFID transponder is moribund. In the circumstance of a refund or return of consumer item, the circuitry can be reconnected as per the Clip Chip methodology and as outlined above.

The useful, non-obvious and novel steps of this Invention are the design of an integrated silicon circuit as two separate pieces connected by a fine piece of conductive material such as conductive ink. Each piece is dependent upon the other in order to function. The two pieces, when separated, provide the benefit and function to consumers of complete consumer privacy as the RFID transponders cannot be skimmed of data once separated. In the circumstance of a consumer requirement to reactivate the RFID tag, such as a returned consumer item to a retail outlet, a returnable, the integrated circuit which remains attached to the tagged consumer item is placed into a returned item interrogator. This returned item interrogator connects to the conductive ink tag end of the piece of the transponder still attached to the consumer good through the use of micro laser technology which guides a magnetic coupling mechanism thereby effectively putting the two pieces of the RFID tag back together again.

I claim:

1. An RFID enabled consumer oriented device which protects consumer privacy in an RFID tagging environment comprising: one complete integrated circuit contained upon two single-crystal silicon conductively connected by a conductive ink; a plurality of electrical components on the two single-crystal silicon, each of the two single-crystal silicon known respectively herein as a detachable piece and a retained piece, yet conductively connected to form one circuit, known as a bifurcated circuit; a plurality of transistors defined within the two single-crystal silicon; each of the plurality of transistors composed of semiconductive material of opposite conductivity types; a silicon antenna and passive transistor circuits etched on the detachable piece; a memory circuit containing electronic product code information and active transistor section etched on the retained piece; an emitter region and a collector region overlying one of said two single-crystal silicon; said one of said two single-crystal silicon providing a base adjacent its major face and said emitter region and said collector region entirely extending to said major face; a plurality of thin elongated regions of the other of said two single-crystal silicon exhibiting electrical resistance to provide semiconductor resistors; the retained piece spaced on said major face to form the memory circuit; antenna, resistors, capacitors plus passive circuitry spaced on the detachable piece; conductive means connecting the active transistor and the memory circuit to the silicon antenna and the passive transistor circuits such that all regions function as one integrated circuit when so connected; means of severing the connection between the retained piece and the detachable piece through a fold or perforation in a substrate of the detachable piece and the retained piece so that the conductive ink can be severed thereby halting the regions function as one integrated circuit; the retained piece is erased and rewritten with a unique alpha numberic identifier at a time of interrogation; the unique alpha numeric identifier can be correlated to original data contained in the retained piece; the original data is retrieved through a new electrical connection formed between a returned item, using a laser directed interrrogator, and the retained piece on the returned item whereby the unique alpha numeric identifier on the retained piece is communicated to a back end host computer.

2. The device of claim 1 whereby the detachable piece has etched thereon a complex resonant RFID antenna.

3. The device of claim 1 whereby the detachable piece has etched thereon the passive transistor circuits comprising resistors and capacitors.

4. The device of claim 1 whereby the retained piece and detachable piece are interrogated at a time of purchase of a consumer item and the electronic product code information on the memory circuit of the retained piece is read and communicated to the back end host computer which administers any specific RFID retail system.

5. The device of claim 1 whereby upon presentation of the returned item for refund or exchange the unique alpha numeric identifier of the retained piece can be connected to a database of the back end host computer whereby the laser directed interrogator magnetically couples to an end of the conductive ink on the retained piece thus communicating the unique alpha numeric identifier to the back end host computer.

* * * * *